United States Patent
Kim et al.

(10) Patent No.: US 11,196,284 B2
(45) Date of Patent: Dec. 7, 2021

(54) ENERGY STORAGE SYSTEM AND CONTROLLING METHOD THEREOF

(71) Applicant: Samsung Electronics Co., Ltd., Suwon-si (KR)

(72) Inventors: Kyungjae Kim, Suwon-si (KR); Gunhyuk Park, Suwon-si (KR); Kwanwoo Song, Suwon-si (KR); Jehyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/695,635

(22) Filed: Nov. 26, 2019

(65) Prior Publication Data

US 2020/0185958 A1    Jun. 11, 2020

(30) Foreign Application Priority Data

Dec. 10, 2018    (KR) .................. 10-2018-0158625

(51) Int. Cl.
*H02J 7/35*    (2006.01)
*H02J 7/00*    (2006.01)
(Continued)

(52) U.S. Cl.
CPC ............. *H02J 7/35* (2013.01); *F24F 11/47* (2018.01); *H02J 3/003* (2020.01); *H02J 3/004* (2020.01);
(Continued)

(58) Field of Classification Search
CPC .. H02J 3/003; H02J 3/004; H02J 3/381; H02J 7/0048; H02J 7/0068; H02J 7/35; H02J 7/23; H02J 7/24; F24F 11/47
(Continued)

(56) References Cited

U.S. PATENT DOCUMENTS 9,639,074 B2    5/2017 Hibiya et al.
2015/0303690 A1  10/2015 Miyazaki et al.
2016/0202682 A1*  7/2016 Matsumoto .............. H02J 7/35
                                                      700/291

FOREIGN PATENT DOCUMENTS

JP    2013-219932 A    10/2013
JP    2016-015857 A     1/2016
(Continued)

OTHER PUBLICATIONS

International Search Report with Written Opinion dated Mar. 23, 2020; International Appln. No. PCT/KR2019/016619.

*Primary Examiner* — Hal Kaplan
(74) *Attorney, Agent, or Firm* — Jefferson IP Law, LLP

(57) ABSTRACT

An energy storage system is provided. The energy storage system includes a battery, a power conversion system, and an energy management system configured to control the power conversion system to supply power to the power consumption system using at least one of a power received from an outside or a power charged in the battery. The energy management system estimates power consumption amounts of the power consumption system for each unit time period in a predetermined time period, a reference power amount based on the battery power charged in the battery and the power consumption amounts, and based on the power consumption amounts and the reference power amount, controls the power conversion system to supply power to the power consumption system using the external power and the battery power during the predetermined time period.

19 Claims, 10 Drawing Sheets

(51) Int. Cl.
  *H02J 3/00*   (2006.01)
  *F24F 11/47*  (2018.01)
  *H02J 3/38*   (2006.01)

(52) U.S. Cl.
  CPC .......... *H02J 7/0048* (2020.01); *H02J 7/0068* (2013.01); *H02J 3/381* (2013.01); *H02J 2300/24* (2020.01)

(58) Field of Classification Search
  USPC .......................................................... 307/20
  See application file for complete search history.

(56) References Cited

FOREIGN PATENT DOCUMENTS

| | | | |
|---|---|---|---|
| JP | 2016-056986 | A | 4/2016 |
| JP | 2018-129939 | A | 8/2018 |
| KR | 10-2013-0120606 | A | 11/2013 |
| KR | 10-2015-0115063 | A | 10/2015 |
| KR | 10-2016-0102654 | A | 8/2016 |
| KR | 10-2017-0073916 | A | 6/2017 |
| KR | 10-2017-0079184 | A | 7/2017 |
| KR | 10-2018-0020672 | A | 2/2018 |

\* cited by examiner

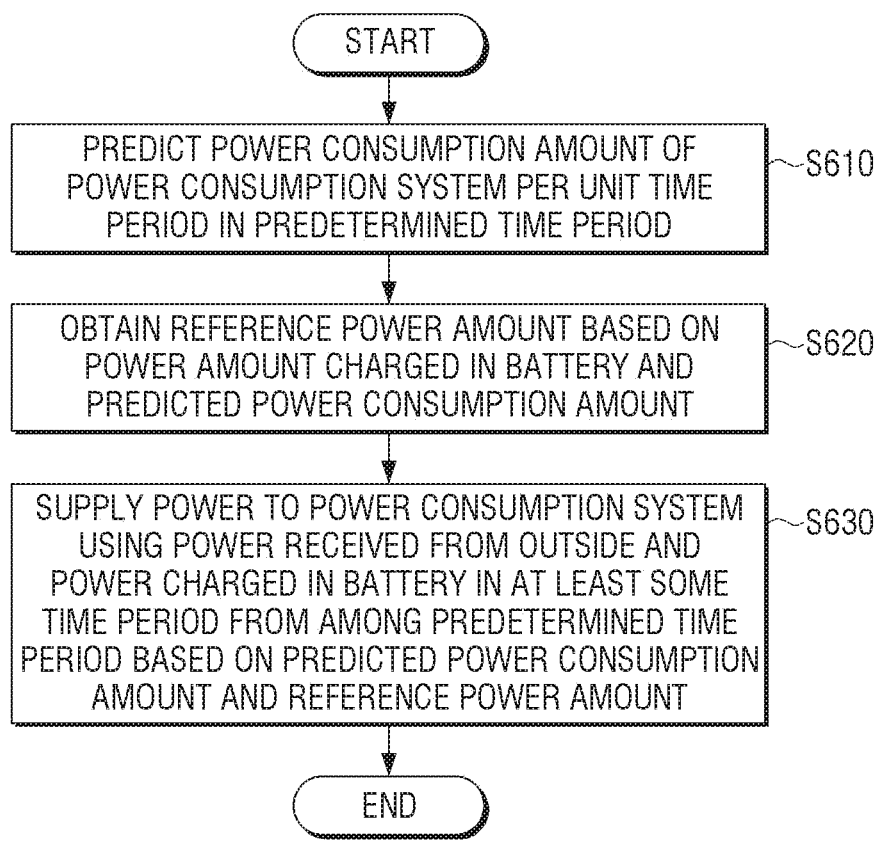

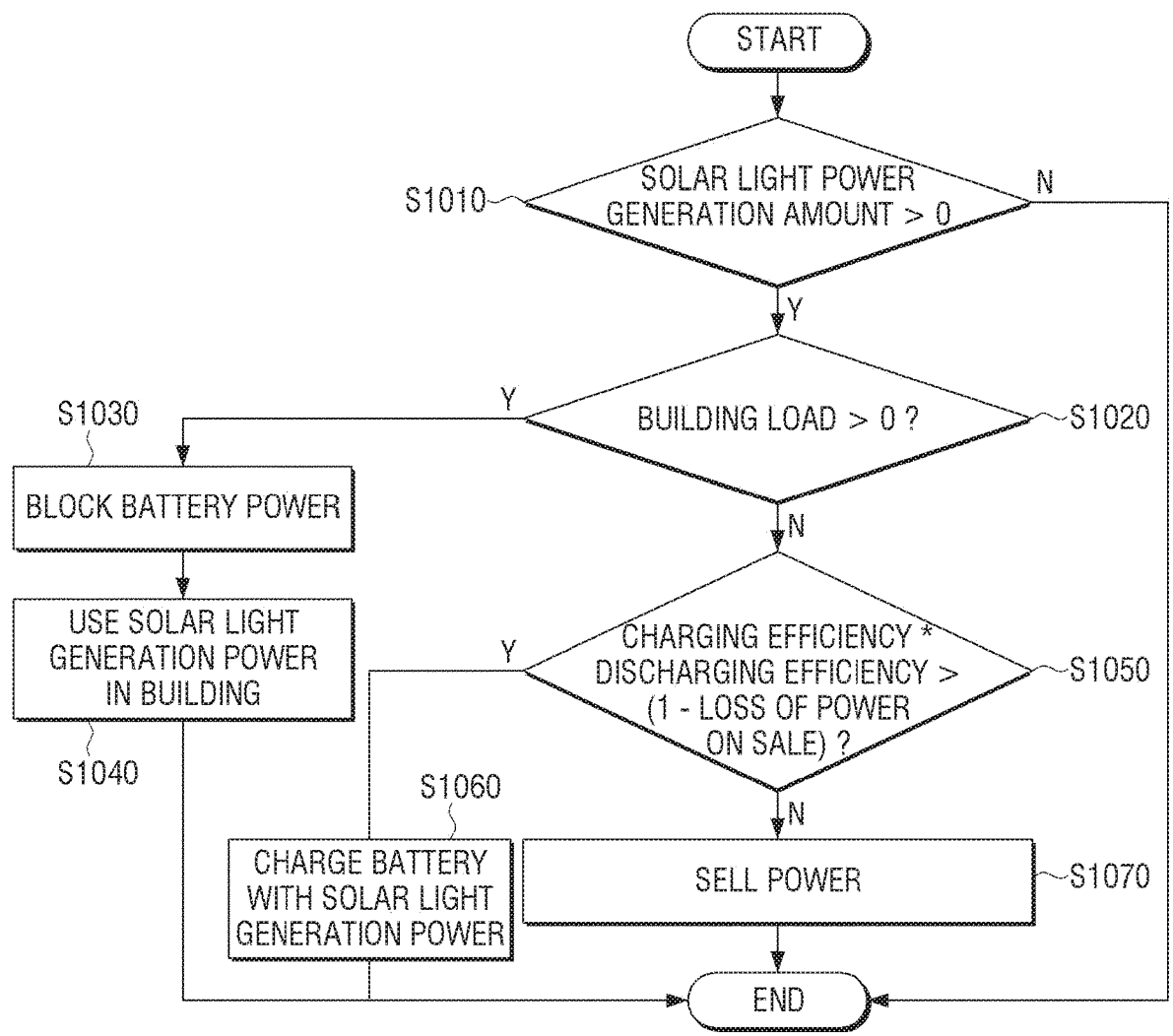

ENERGY STORAGE SYSTEM AND CONTROLLING METHOD THEREOF

CROSS-REFERENCE TO RELATED APPLICATION(S)

This application is based on and claims priority under 35 U.S.C. § 119(a) of a Korean patent application number 10-2018-0158625, filed on Dec. 10, 2018, in the Korean Intellectual Property Office, the disclosure of which is incorporated by reference herein in its entirety.

BACKGROUND

1. Field

The disclosure relates to an energy storage system. More particularly, the disclosure relates to an energy storage system which charges its battery in a low demand period where an electricity fee is relatively cheap, and uses all power charged in the battery as much as possible in an intermediate demand period and a high demand period where the electricity fee is relatively expensive.

2. Description of Related Art

Energy storage system is increasingly installed and used as a way to efficiently use energy in related-art power generation systems, power transmission and distribution facilities, homes, factories, companies, and large buildings, and reduce electricity charges.

In general, the energy storage system charges the battery by acquiring power from the system in a low demand period where the electricity demand is relatively low and the electric charge is low, and appropriately uses the charged power in an intermediate demand period and a high demand period, and has an advantageous effect of reducing power charges for individuals and corporations, and preventing excessive surplus of power demand at a specific time for public.

A battery charging and discharging technique of a related-art energy management system includes a peak shaving mechanism and a load shifting mechanism.

FIG. 1A illustrates a peak shaving mechanism, and FIG. 1B illustrates a load shifting mechanism.

In the graphs of FIGS. 1A and 1B, the horizontal axis represents time and the vertical axis represents a power consumption according to an elapse of time.

In the graphs of FIGS. 1A and 1B, the target power is a power value which is arbitrarily set to prevent a situation where a basic fee increases or to receive the institutional profit that the basic fee is reduced. In the disclosure, it is assumed that when the average power obtained from the system during at least one time period of a predetermined size exceeds a target power, the basic fee may be increased as compared with when it does not.

Referring to FIG. 1A, it may be understood that an energy management system according to the peak shaving mechanism may charge the battery during the low demand period where the electric charge is relatively low, and then consume the power charged in the battery only during a time period 20 where the power consumption exceeds the target power from among the high demand period where the electric charge is relatively high, by the amount in excess.

In this case, the advantage is that the power consumption does not exceed the target power. However, there is a drawback that some of the opportunity for cost reduction is lost because not all the power charged in the battery is consumed.

Referring to FIG. 1B, it may be understood that an energy management system according to the load shifting mechanism may charge the battery during the low demand period, and then first consume the power charged in the battery without obtaining the power from the system.

In this case, there is an advantage that all power charged in the battery is used and thus that the opportunity for cost reduction is never lost. However, after all power charged in the battery is consumed, it is inevitable to obtain power of an amount in excess of the target power for at least a predetermined period of time without any alternative, in a time period where the power consumption exceeds the target power. As a result, the basic fee may rise.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an energy storage system for supplying power to a power consumption system is provided. The energy storage system includes a battery, a power conversion system, and an energy management system configured to control the power conversion system to supply power to the power consumption system using at least one of an external power that is received from an outside or a battery power that is charged in the battery. The energy management system may be further configured to estimate power consumption amounts of the power consumption system for each unit time period in a predetermined time period, to obtain a reference power amount based on the battery power charged in the battery and the power consumption amounts, to based on the power consumption amounts and the reference power amount, control the power conversion system to supply power to the power consumption system using the external power and the battery power during the predetermined time period.

The energy management system may be further configured, determine a first time period where a first estimated power consumption amount exceeds the reference power amount, control the power conversion system to supply power to the power consumption system using the external power and the battery power during the first time period, determine a second time period where a second estimated power consumption amount is less than or equal to the reference power amount, and control the power conversion system to supply power to the power consumption system using the external power during the second time period.

The reference power amount is a value at which a sum of power amounts which are respectively obtained by subtracting each of the estimated power consumption amounts exceeding the reference power amount by the reference power amount, is equal to the power amount charged in the battery.

A reference power is less than or equal to a target power and is obtained by dividing the reference power amount by a duration of the predetermined time period. A cost per a unit power when an average value of the external power in the predetermined time period exceeds the target power is higher than a cost per a unit power when an average value of the external power in the predetermined time period is less than or equal to the target power.

The energy management system may be further configured to control the power conversion system to charge an amount of power in the battery that allows a reference power, which is obtained by dividing the reference power amount by a duration of the unit time period, to be less than or equal to the target power using an external power in a different predetermined time period.

The energy management system may be further configured to estimate a remaining power amount of the battery at a second time point, and to control the power conversion system to charge the battery from a first time point to the second time point using the external power based on the target power, the remaining power amount of the battery, and a power consumption amount after the second time point to a third time point.

The energy management system may be further configured to, based on a value, which is obtained by adding power amounts obtained by subtracting the estimated power consumption amount by the target power amount per the unit time period included in a time period where the estimated power consumption amount is larger than a target power amount obtained by multiplying the target power by a size of the unit time period from among a time period from the second time point to the third time point being larger than the estimated remaining power amount of the battery, control the power conversion system to charge the battery in a time period from the first time point to the second time point using the external power.

The energy storage system may further include a power generation system. The energy management system may be further configured to estimate a power production amount of the power generation system from the second time point to the third time point, and to control the power conversion system to charge the battery in a time period from the first time point to the second time point using the external power.

The energy storage system may further include a power generation system. The energy management system may be further configured to, when a power production amount of the power generation system is larger than a power consumption amount of the power consumption system, control the power conversion system to charge the battery with at least some of power produced in the power generation system or to transmit the at least some of power produced in the power generation system to the outside based on a charging efficiency of the battery, a discharging efficiency of the battery, and a loss rate of power transmitted to the outside.

The energy management system is configured to estimate a power consumption of the power consumption system, and identify a first time point where a power consumption will exceed the target power, and to control a power consumption amount of the power consumption system based on a remaining power amount remaining in the battery at a second time point before the first time point, a power consumption of the power consumption system at the second time point, and the target power.

The energy storage system may further include a power generation system. The energy management system may be further configured to control a power consumption amount of the power consumption system based on a power amount remaining in the battery at a third time point before the first time point, a power consumption of the power consumption system at the second time point, a power production of the power generation system at the third time point, and the target power.

The energy management system may be further configured to estimate a power consumption of the power consumption system, and identify a first time point where the estimated power consumption exceeds the target power, and control the power conversion system to charge the battery using the external power based on a power amount remaining in the battery at a second time point before the first time point, a power consumption of the power consumption system at the second time point, and the target power.

The energy storage system may further include a power generation system. The energy management system may be further configured to, control the power conversion system to charge the battery using the external power based on a power amount remaining in the battery at a third time point before the first time point, a power consumption of the power consumption system at the third time point, a power production of the power generation system at the third time point, and the target power.

The energy management system may be further configured to, control a power consumption amount of a plurality of electronic devices of the power consumption system according to a priority of the plurality of electronic devices and based on a power amount remaining in the battery at a current time point, a power consumption of the power consumption system at a current time point, and the target power.

The energy storage system may further include a power generation system. The energy management system may be further configured to, control a power consumption amount of a plurality of electronic devices of the power consumption system according to a priority of the plurality of electronic devices based on a power amount remaining in the battery at the current time point, a power consumption of the power consumption system at the current time point, a power consumption of the power generation system at the current point, and the target power.

In accordance with another embodiment of the disclosure, a controlling method of an energy storage system for supplying power to a power consumption system is provided. The controlling method includes estimating a power consumption amounts of the power consumption system for each unit time period in a predetermined time period, obtaining a reference power amount based on a battery power that is charged in a battery of the energy storage system and the power consumption amounts, and based on the power consumption amounts and the reference power amount, supplying power to the power consumption system using external power from the outside and the battery power charged.

The supplying power to the power consumption system may include, determining a first time period in the predetermined time period where an estimated power consumption amount exceeds the reference power amount, supplying power to the power consumption system using the external power and the battery power during the first time period, determining a second time period in the predetermined time period where an estimated power consumption is less than or equal to the reference power amount, and supplying power to the power consumption system using the external power during the second time period.

The obtaining of the reference amount may include identifying a plurality of time unit periods having a power consumption amount that is greater than a first reference power amount, subtracting the power consumption amount of each of the plurality of time unit periods from the first reference power amount to generate a differential power list, obtaining a sum of each value in the differential power list, and based on the obtained sum being zero, determining the reference power amount as the first reference power amount.

The reference power may be associated with a previous reference power amount from a different predetermined time interval. The reference power may be divided by a number time unit periods in the different predetermined time interval that have a power consumption amount that is greater than a previous reference power. The supplying of the power to the power consumption system using the external power during the second time period may include supplying power of the reference power amount from the battery for each time unit period that has a power consumption amount that is greater than the reference power amount and supplying power of a remaining power amount from the external power for each time unit period that has a power consumption amount that is greater than the reference power amount.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart of a controlling method of an energy management system, according to an embodiment of the disclosure;

FIG. 10 is a diagram provided to explain an embodiment to effectively process a spare power produced in a power generation system according to an embodiment of the disclosure.

The same reference numerals are used to represent the same elements throughout the drawings.

DETAILED DESCRIPTION

Figure 1A:
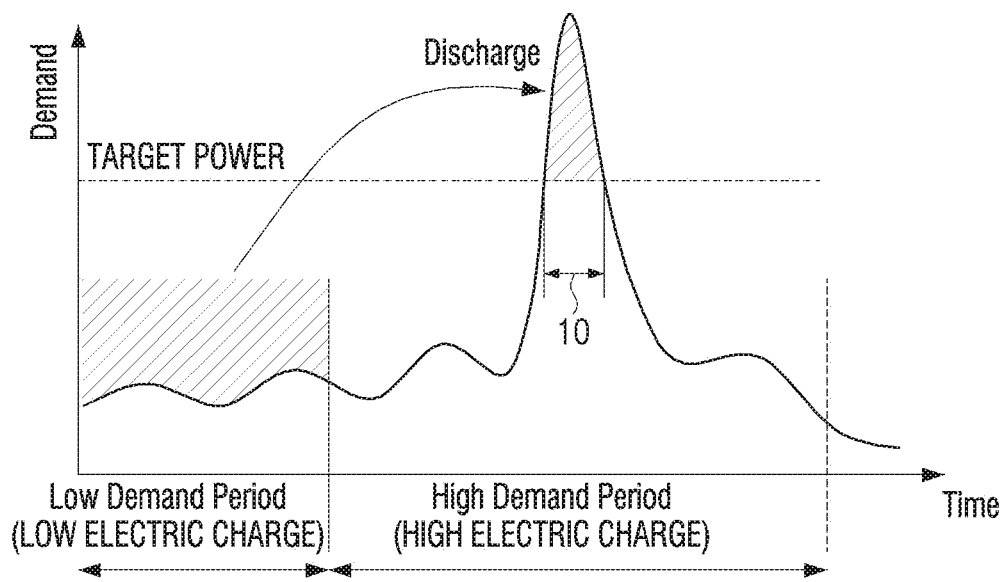
FIGS. 1A and 1B illustrate graphs provided to explain a battery charging/discharging mechanism of an energy management system according to various embodiments of the disclosure.
Figure 1B:
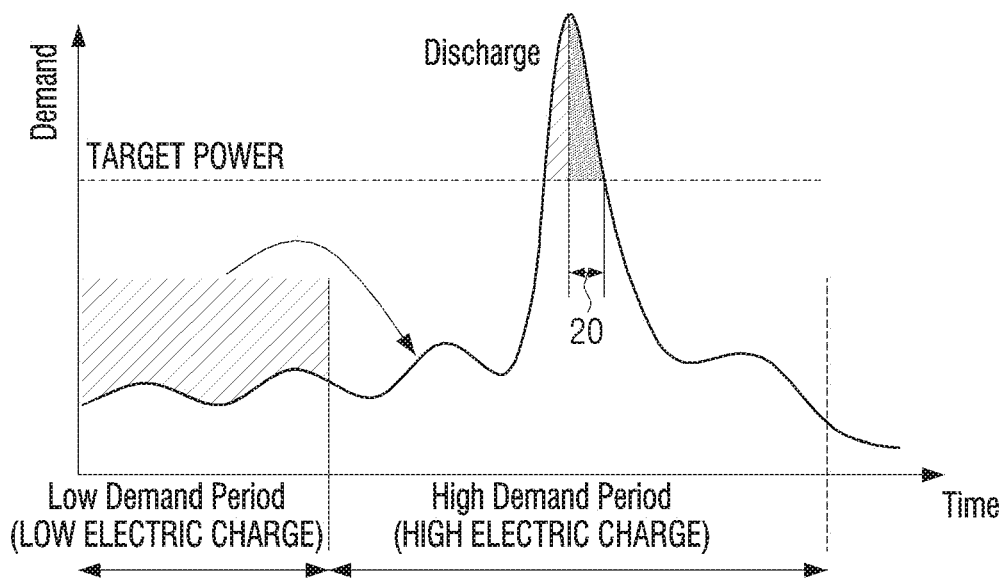

Aspects of the disclosure are to address at least the above-mentioned problems and/or disadvantages and to provide at least the advantages described below. Accordingly, an aspect of the disclosure is to provide an energy management system for supplementing the weaknesses in battery charging and discharging technique of a related-art energy management system.

Another aspect of the disclosure is to provide an energy management system which controls a period and amount of discharging of a battery based on making estimations about power consumption so that the usage of the charged power during the low demand period is maximized without spending more power than the target power.

Another aspect of the disclosure is to provide an energy management system which can reduce power costs more than the related-art energy management system by using a power generator using alternative energy sources such as a solar photovoltaic generator.

Additional aspects will be set forth in part in the description which follows and, in part, will be apparent from the description, or may be learned by practice of the presented embodiments.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before specifically describing the disclosure, a method for demonstrating the disclosure and drawings will be described.

First of all, the terms used in the disclosure and the claims are general terms selected in consideration of the functions of the various embodiments of the disclosure. However, these terms may vary depending on intention, legal or technical interpretation, emergence of new technologies, and the like of those skilled in the related art. Also, there may be some terms arbitrarily selected by an applicant. Unless there is a specific definition of a term, the term may be construed based on the overall contents and technological common sense of those skilled in the related art.

Also, the same reference numerals or symbols described in the attached drawings denote parts or elements that actually perform the same functions. For convenience of descriptions and understanding, the same reference numerals or symbols are used and described in different embodiments. In other words, although elements having the same reference numerals are all illustrated in a plurality of drawings, the plurality of drawings do not mean one embodiment.

Further, the terms including numerical expressions such as a first, a second, and the like may be used to explain various components, but there is no limitation thereto. The ordinal numbers are used in order to distinguish the same or similar elements from one another, and the use of the ordinal number should not be understood as limiting the meaning of the terms. For example, used orders, arrangement orders, or the like of elements that are combined with these ordinal numbers may not be limited by the numbers. The respective ordinal numbers are interchangeably used, if necessary.

The singular expression also includes the plural meaning as long as it does not differently mean in the context. Throughout this disclosure, it will be understood that the term "comprise" and variations thereof, such as "comprising" and "comprises", specify the presence of features, numbers, steps, operations, components, parts, or combinations thereof, described in the disclosure, but do not preclude the presence or addition of one or more other features, numbers, steps, operations, components, parts, or combinations thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

Figure 2:
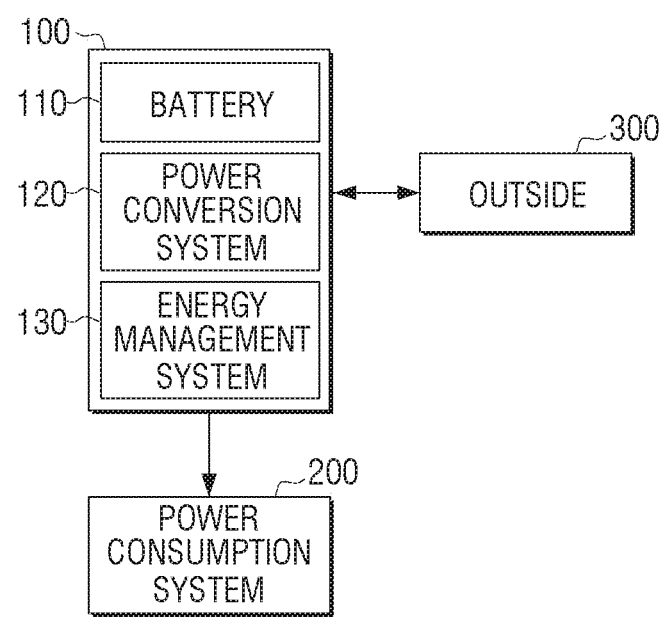
FIG. 2 is a block diagram provided to explain a role and configuration of an energy management system, according to an embodiment of the disclosure.

FIG. 2 is a block diagram provided to explain a role and configuration of an energy storage system, according to an embodiment of the disclosure.

Referring to FIG. 2, the energy storage system 100 may be connected to a power consumption system 200, and supply power to the power consumption system 200. In addition, the energy storage system 100 may be connected to the outside 300 and obtain power, and store the obtained power or supply it to the power consumption system 200. Alternatively, the stored power may be transmitted to the outside 300.

The power consumption system 200 may be of a variety of types such as homes, factories, buildings, systems and specific regions that consume power. For example, the power consumption system 200 may refer to one or more electronic devices included in a home, a building, a system, a specific region, etc., and consuming power.

The outside 300 may be a power transmission line and/or power distribution line connected to at least one of external power generation system and/or a substation, and may be an external power system of a broader scope including all of them. The power management system according to an embodiment of the disclosure has a purpose of minimizing the electric charges for the power consumed by the power consumption system 200. In the disclosure, the outside 300 includes all of an external power generation system, a substation, a power transmission line, a power distribution line, etc., and it is appropriate to consider that the outside 300 refers to an external power system that charges fees for places such as houses, factories, buildings and the like according to the power consumed by electronic devices belonging to the respective places.

The energy storage system 100 may include a battery 110 which supplies power to the power consumption system 200 or is charged to transmit or receive power in relation to the outside 300, a power conversion system 120, and an energy management system 130.

The battery 110 is configured to charge power. The battery 110 may be variously implemented as a lead battery, a nickel-cadmium battery, a nickel-hydrogen battery, a lithium ion battery, or a lithium ion polymer battery, and is generally a form of connecting a large number of lithium-ion batteries.

The power conversion system 120 may be connected to the battery 110, the power consumption system 200 and the outside 300, and transmit or receive power. The power conversion system 120 may obtain power and charge the battery 110, radiate the obtained power to the outside 300, or convert the power characteristics such as a frequency, voltage, direct current (DC)/indirect current (IC) of the obtained power and supply the power to the power consumption system 200. In addition, the power conversion system 120 may be connected to one or more power generation systems (not illustrated) and convert power generated in the power generation system, and charge the converted power in the battery 110 or supply it to the power consumption system 200 or transmit it to the outside 300.

To this end, the power conversion system 120 may include an IC/DC converter, a frequency converter, a transformer, and etc.

The energy management system 130 is configured to control overall operations of the energy storage system 100. The energy management system 130 may be connected to the power conversion system 120, and control the power conversion system 120 so that the power transmission/reception is performed among the battery 110, the power consumption system 200, the outside 300 and the one or more power generation systems (not illustrated).

For example, the energy management system 130 may control the power conversion system 120 to supply power to the power consumption system 200 by using at least one of the power obtained from the outside 300 or the power charged in the battery.

The energy management system 130 may include random access memory (RAM) (not illustrated), read only memory (ROM) (not illustrated), a central processing unit (CPU) (not illustrated), a system bus (not illustrated), etc., and may be implemented as one or more chips.

The energy management system 130 may include one or more memory (not illustrated) and a communicator comprising a circuitry (not illustrated). In this case, the memory (not illustrated) may be implemented as non-volatile memory (e.g., hard disk, solid state drive (SSD) and flash memory), volatile memory and the like.

The communicator (not illustrated) may be implemented as a wireless communication module such as a Wi-Fi Direct communication module, a Bluetooth module, an infrared data association (IrDA) module, a near field communication (NFC) module, a Zigbee module, a cellular communication module, a Third Generation (3G) mobile communication module, a Fourth Generation (4G) mobile communication module, a Fourth-Generation long term evolution (LTE) communication module and the like. Alternatively, the communicator may be implemented as an interface module such as a universal serial bus (USB) and/or a cable port capable of transmitting power and/or signals.

The energy management system 130 may be connected to one or more external devices (not illustrated) via the communicator (not illustrated) and the like, and perform communication. For example, the energy management system 130 may be connected to the power consumption system 200 via the communicator (not illustrated), and control the power consumption of the power consumption system 200. For example, a control signal to increase or decrease the power consumption of one or more electronic devices included in the power consumption system 200 may be transmitted to the power consumption system 200.

The energy management system 130 may continuously estimate the power consumption of the power consumption system 200 with reference to a predetermined time period, or quantitatively estimate the power consumption of the power consumption system 200 per a unit time period included in the predetermined time period.

For example, the energy management system 130 may estimate a power consumption or an amount of power consumption per a unit time period of the power consumption system 200 based on data on the past power consumption of the power consumption system 200 stored in a memory (not illustrated), data on date and time, data on the past power consumption and operating time of each of one or more electronic devices included in the power consumption system 200, data on the degree of aging of each of one or more electronic devices included in the power consumption system 200, and data on the weather information received from an external device (not illustrated) via a communicator (not illustrated). The energy management system 130 may estimate an amount of power consumption of the power consumption system 200 using an artificial intelligence model which is stored in the memory (not illustrated) and trained to estimate hourly power consumption or an amount of power consumption per a unit time period.

A predetermined time period may include a time for which a battery of the energy storage system 100 is discharged and the power is supplied to the power consumption system 200. The predetermined time period may be a first predetermined time period including at least a portion of the high demand period, that is, an intermediate-to-high demand period rather than a low demand period.

The unit time period may be obtained by dividing a time period included in the predetermined time period into multiple periods of a predetermined size. For example, in a case that the predetermined time period corresponds to a total of 14 hours, the unit time period may be set as ten minutes, 30 minutes, one hour, two hours, etc., and the predetermined time period may be uniformly divided. However, the example is not limited thereto.

In a case that the power consumption of the power consumption system 200 for the first predetermined time period is continuously estimated, the energy management system 130 may obtain a reference power based on the estimated power consumption and an amount of power charged in the battery.

The reference power may be a value at which an amount of power obtained by differentiating a difference value between the estimated power consumption and the reference power with respect to the time period in which the estimated power consumption exceeds the reference power from among the first predetermined time period is equal to an amount of power charged in the battery 110 during a second predetermined time period which is different from the first predetermined time period. In this case, there is an advantage that the use of the power charged in the battery 110 can be maximized.

Alternatively, the reference power may be a value at which an amount of power obtained by differentiating a difference value between the estimated power consumption and the reference power with respect to the time period in which the estimated power consumption exceeds the reference power from among the first predetermined time period is less than the amount of power charged in the battery during the second predetermined time period by more than a predetermined power amount. The predetermined power amount may be set in consideration of an error range of the estimated power consumption.

In this case, the energy management system 130 may, in a time period during which the estimated power consumption exceeds the reference power from among the first predetermined time period, discharge the battery 110 as the surplus power consumption to the reference power and supply the discharged power to the power consumption system 200. That is, during a time period in which the estimated power consumption exceeds the reference power, both the power received from the outside 300 and the power charged in the battery 110 may be used to supply power to the power consumption system 200.

The second predetermined time period different from the first predetermined time period may include the low demand period, that is, at least a portion of the low demand period. The electric charge per a unit power received from the outside 300 in the second predetermined time period may be less than the electric charge per a unit power received from the outside 300 in the first predetermined time period. In this case, the time period which is the sum of the first and second predetermined time periods may correspond to 24 hours.

That is, the energy management system 130 may receive power supply from the outside 300 in the second predetermined time period and charge the battery 110, and obtain the reference power so that all of the amount of power charged in this way is consumed in the first predetermined time period.

In this case, the reference power may be less than or equal to the target power. To this end, the energy management system 130 may control the power conversion system 120 so that an amount of power that allows the reference power to be less than or equal to the target power is charged in the battery 110 using the power received from the outside 300 in the second predetermined time period.

Figure 3A:
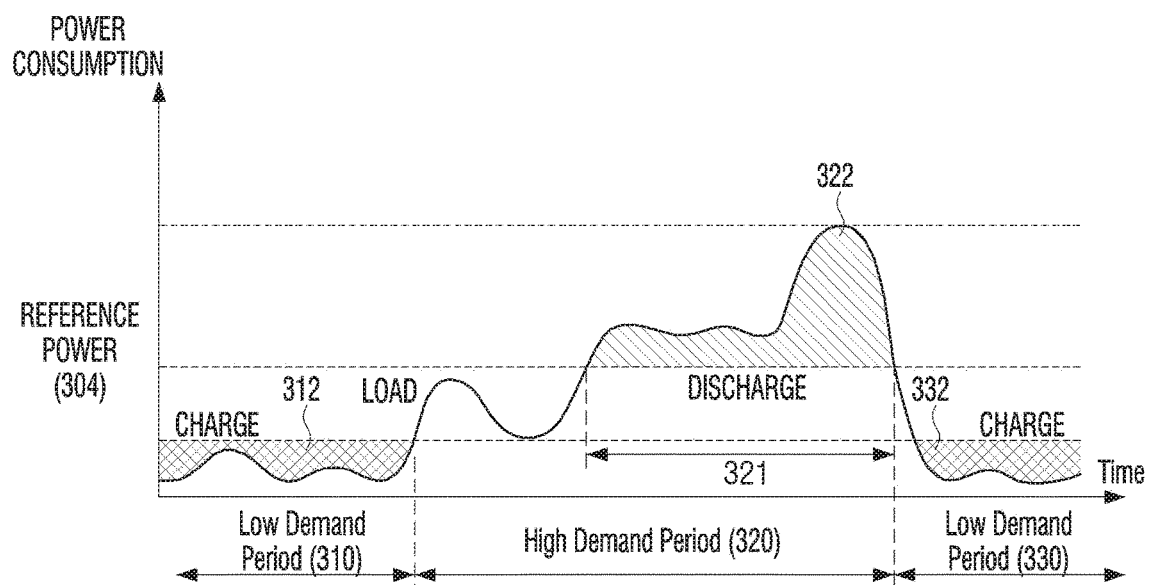
FIGS. 3A and 3B illustrate graphs provided to explain a reference power or a reference power amount, to allow all power charged during the low demand period time period to be used during the high demand period according to various embodiments of the disclosure.
Figure 3B:
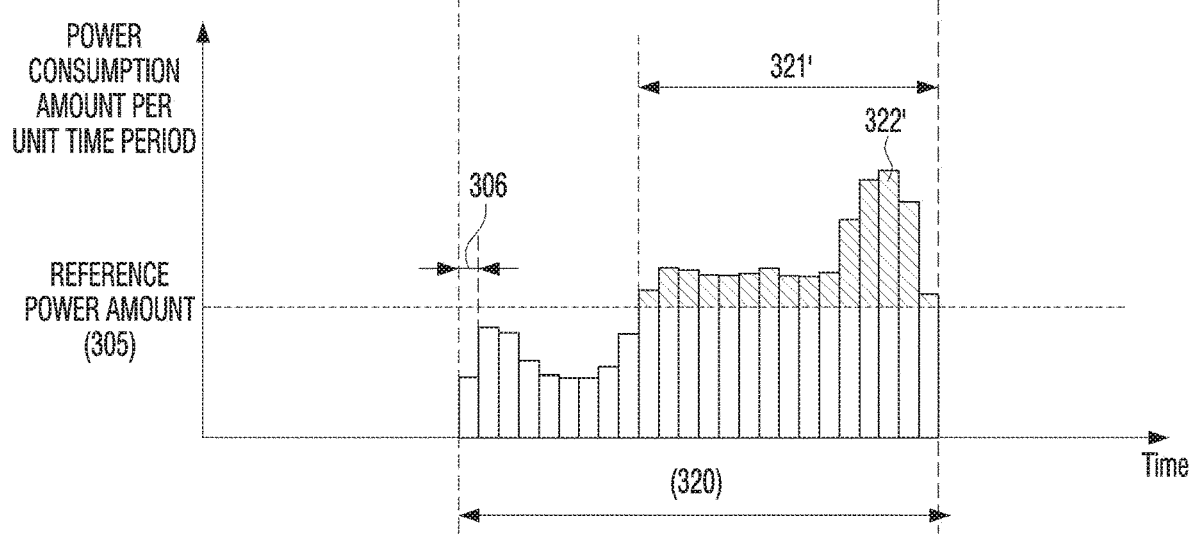

FIGS. 3A and 3B illustrate graphs provided to explain a reference power or a reference power amount, to allow all power charged during the low demand period time period to be used during the high demand period according to various embodiments of the disclosure.

FIG. 3A is a graph illustrating a reference power 304 preset to consume all power charged during the low demand period. The horizontal axis indicates time, and the vertical axis indicates an estimated power consumption according to an embodiment of the disclosure.

Referring to FIG. 3A, an amount of power 312 charged in the battery 110 during the low demand period 310 is equal to an amount of power 322 which is obtained by differentiating a difference between the estimated power consumption and the reference power 304 with respect to a time period 321 in which the estimated power consumption is larger than the reference power 304 from among the high demand period 320.

The sum of time periods of the low demand period 310 and the high demand period 320 may correspond to 24 hours.

Referring to FIG. 3A, it may be understood that when the high demand period 320 period is ended, a new low demand period 330 is started and a particular power amount 332 is charged in the battery 110.

In a case that an amount of power consumption of the power consumption system 200 is quantitatively estimated per a unit time period included in a predetermined time period, the energy management system 130 may obtain an amount of reference power based on the estimated power consumption amount and the amount of power charged in the battery.

The amount of reference power may be a value at which the sum of power amounts obtained by subtracting a power consumption amount estimated per a unit time period included in a time period in which the estimated power consumption amount exceeds the reference power amount from among the predetermined time period by the reference power amount is equal to the amount of power charged in the battery 110. The amount of power charged in the battery 110 may be an amount of power charged in the battery 110 during the second predetermined time period which is different from the first predetermined time period. In this case, the first predetermined time period may be a time period during which the electric charge per a unit power is relatively high, and the second predetermined time period may be a time period during which the electric charge per a unit power is relatively low.

The amount of reference power may be a value at which the sum of power amounts obtained by subtracting a power consumption amount estimated per a unit time period included in a time period in which the estimated power consumption amount exceeds the reference power amount from among the predetermined time period by the reference power amount is equal to the amount of power charged in the battery 110. The predetermined power amount may be set in consideration of an error range of the estimated power consumption.

The reference power obtained by dividing the reference power amount by a size of a unit time period may be less than or equal to the target power. In this case, the energy management system 130 may control the power conversion system 120 so that an amount of power that allows the reference power to be less than or equal to the target power and is charged in the battery 110 using the power received from the outside 300 during the second predetermined time period.

In addition, the energy management system 130 may control the power conversion system 120 so that power is supplied to the power consumption system using the power received from the outside 300 and the power charged in the battery 110 during at least some time period from among the first predetermined time interval based on the estimated power consumption amount and the reference power amount.

In detail, the energy management system 130 may control the power conversion system 120 so that power is supplied to the power consumption system 200 using the power received from the outside 300 and the power stored in the battery 110 in a time period during which the estimated power consumption amount exceeds the reference power amount from among the first predetermined time period. In addition, the energy management system 130 may control the power conversion system 120 so that power is supplied to the power consumption system 200 using the power received from the outside 300 in a time period during which the estimated power consumption amount is less than or equal to the reference power amount from among the first predetermined time period.

FIG. 3B is a graph illustrating a reference power amount 305 preset to consume all power charged during the low demand period. The horizontal axis indicates time, and the vertical axis indicates power consumption amount of the power consumption system 200 which is estimated per a unit time period 306 according to an embodiment of the disclosure.

Referring to FIG. 3B, the power amount 312 charged in the battery 110 during the low demand period 310 may be equal to the power amount 322' obtained by adding all power amounts obtained by subtracting a power consumption amount estimated per a unit time period by the reference power amount 305 with respect to the time period 321' in which the estimated power consumption amount is larger than the reference power amount 305 from among the high demand period 320.

Referring to FIG. 3B, the energy management system 130 may, only during the time period 321' in which the estimated power amount is larger than the reference power amount 305 from among the high demand period 320, supply power to the power consumption system 200 using both the power charged in the battery 110 and the power received from the outside 300.

For example, the power conversion system 120 may be controlled so that the battery 110 supplies, to the power consumption system 200, a power amount as much as a difference between the estimated power consumption amount and the reference power amount 305 per a unit time period in the time period 321'. As a result, a power as much as the power amount 322' (within an error range) from among the power charged in the battery 110 may be supplied to the power consumption system 200 during the first predetermined time period.

Figure 4:
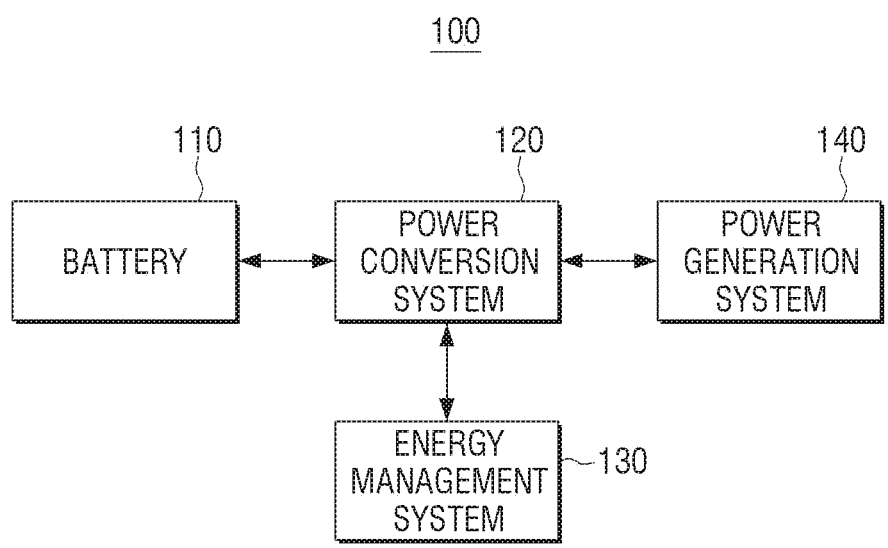
FIG. 4 is a block diagram illustrating a configuration of an energy management system including a power generator, according to an embodiment of the disclosure.

FIG. 4 is a block diagram provided to explain a configuration of an energy storage system including a power generation system according to an embodiment of the disclosure.

Referring to FIG. 4, the energy storage system 100 may further include the power generation system 140 in addition to the elements illustrated in FIG. 2 (the battery 110, the power conversion system 120, and the energy management system 130).

The power generation system 140 may be implemented as a thermal power generation device and a nuclear power generation device, but may be implemented as a power generation device related to new renewable energy such as a solar power generation device, a wind power generation device, a hydropower generation device, a soil power generation device and the like.

In particular, in a case that the electric charge for the power received from the outside 300 corresponding to the external power system is related to the degree of use of new renewable energy, the energy storage system 100 may save the electric charges by including and using the power generation system 140 to which this new renewable energy technology is applied. For example, the electric charge may be saved by using the power generated in the power generation system 140 in the power consumption system 200.

In general, a period with a large power system load from among high demand period often corresponds to daylight hours (i.e., the morning until the evening). In this case, to prevent the average of the power received from the outside 300 from exceeding the target power, the energy storage system 100 may include a power generation system 140. For example, the power generation system can be implemented by a solar power generation system with best production efficiency during daylight hours.

The energy management system 130 may estimate a power production of the power generation system 140 or a power production amount per a unit time period on the basis of weather information stored in the memory (not illustrated) or received from an external device (not illustrated) via the communicator (not illustrated). For example, in a case that the power generation system 140 is a solar power generation system, the energy management system 130 may estimate the power production of the power generation system 140 or the power generation amount per a unit time period on the basis of a solar radiation quantity, humidity, temperature of a solar cell, production efficiency of the power generation system 140, etc.

In addition to the previous embodiments in which the energy management system 130 obtains a reference power or a reference power amount, and pre-charges the battery 110 on the basis of the obtained reference power or the obtained reference power amount, the energy management system 130 may obtain a reference power or a reference power amount in further consideration of the estimated power production (or power production amount per a unit time period) of the power generation system 140, and charge the battery 110 based on the obtained reference power or the obtained reference power amount. In this case, the energy management system 130 may estimate a power production amount of the power generation system 140 per a unit time period with respect to a predetermined time period.

The obtained reference power amount may be a value at which a power amount obtained by adding all power amounts obtained by subtracting a power consumption amount estimated per a unit time period by a reference power amount and a power generation amount is equal to a power amount charged in the battery, with respect to a time period where the estimated power consumption amount exceeds the sum of the (estimated) power production amount of the power generation system 140 and the reference power amount from among the first predetermined time period. Alternatively, the value may be a value obtained by further considering an error of the estimated power production amount and estimated power consumption amount of the power generation system 140.

The energy management system 130 may control the power conversion system 120 so that power is supplied to the power consumption system 200 using the power received from the outside 300, the power produced in the power generation system 140 and the power stored in the battery 110, in a time period where the estimated power consumption amount exceeds the sum of the estimated power generation amount and the reference power amount from among the first predetermined time period. In addition, in a time period where the estimated power consumption amount is less than or equal to the sum of the estimated power generation amount and the reference power amount from among the first predetermined time period, the power conversion system may be controlled so that power is supplied to the power consumption system 200 using only the power received from the outside 300 and the power produced in the power generation system 140.

Even in the first predetermined time period where the electric charge for the power received from the outside 300 is relatively high, it is necessary to respond in real time so that the average of power received from the outside 300 does not exceed the target power in an upcoming time period.

To this end, the energy management system 130 may estimate a remaining power amount of the battery 110 at a second time point which is a predetermined time after a first time point. For example, in the energy storage system 100 as in FIG. 2, the energy management system 130 may estimate the remaining power amount of the battery 110 with respect to the second time point in consideration of the estimated power consumption amount of the power consumption system 200, the reference power amount and the power amount remaining in the battery 110 by hour.

In addition, the energy management system 130 may control the power conversion system 120 so that the battery 110 is charged using the power received from the outside 300 during a time period from the first time point to the second time period, on the basis of the target power, the estimated remaining power amount of the battery 110 and the power consumption estimated in a time period from the second time point to a predetermined time after.

In addition, the energy management system 130 may control the power conversion system 120 so that the battery 110 is charged using the power received from the outside 300 during a time period from the first time point to the second time period, on the basis of the target power, the estimated remaining power amount of the battery 110 and the power consumption amount estimated in a time period from the second time point to a predetermined time after.

In this case, both the time period between the first time point and the second time point and the time period from the second time point and a predetermined time after may be included in a predetermined time period. The first predetermined time period may be a period where the electric charge per a unit power is relatively high, such as the high demand period.

For example, the energy management system 130 may identify whether the sum of power amounts obtained by subtracting a power consumption amount estimated per a unit time period by a target power amount is larger than the estimated remaining power amount of the battery 110, with respect to a time period where the estimated power consumption amount is larger than a target power amount obtained by multiplying the target power by a size of a unit time period from among the time period from the second time point to a predetermined time after. If larger, the power conversion system 120 may be controlled so that the battery 110 is charged using the power received from the outside during the time period from the first time point to the second time point.

Further, if the energy storage system 100 is configured to further include the power generation system 140 as in FIG. 4, the energy management system 130 may estimate a power production or a power production amount per a unit time period of the power generation system 140 in the time period from the second time point to a predetermined time after, and control the power conversion system 120 so that the battery 110 is charged using the power received from the outside 300 during the time period from the first time point to the second time point in further consideration of the estimated power production or the estimated power production amount.

For example, the energy management system 130 may, in a process of determining a remaining power amount of the battery 110 at the first time point, estimate a power production or a power production amount per a unit time period of the power generation system 140 up to the first time point.

In addition, the energy management system 130 may estimate a power production of the power generation system 140 in the time period from the second time point to a predetermined time after. In this case, the energy management system 130 may obtain a power amount by differentiating a value obtained by subtracting the estimated power consumption by the estimated power production and the target power with respect to a time period where a value obtained by subtracting the estimated power consumption by the estimated power production is larger than the target power. If the obtained power amount is larger than the remaining power amount of the battery 110 estimated with respect to the first time point, the power conversion system 120 may be controlled so that the battery 110 is charged using the power received from the outside during the time period from the first time point to the second time point.

In addition, the energy management system 130 may estimate a power production amount of the power generation system 140 per a unit time period with respect to the time period from the second time point to a predetermined time period after. In this case, the energy management system 130 may, with respect to a time period where the a power amount obtained by subtracting an estimated power consumption amount by an estimated power production amount is larger than a target power amount from among the time period from the second time point and a predetermined time after, identify whether the sum of power amounts obtained by subtracting a power consumption amount estimated per a unit time period by the estimated power production amount and the target power amount is larger than the remaining power amount of the battery 110 estimated with respect to the first time point. If larger, the power conversion system 120 may be controlled so that the battery 110 is charged using the power received from the outside during the time period from the first time point to the second time point.

Figure 5A:
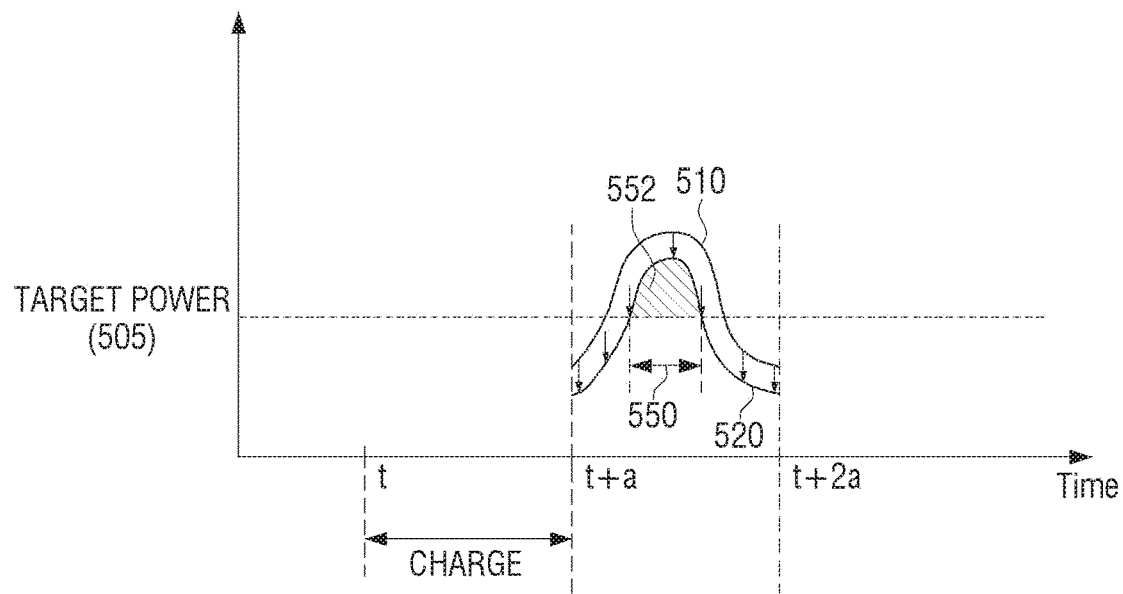
FIGS. 5A and 5B illustrate graphs provided to explain an embodiment to respond in real time so that an average of powers obtained from an external source does not exceed a target power within a predetermined time period according to various embodiments of the disclosure.
Figure 5B:
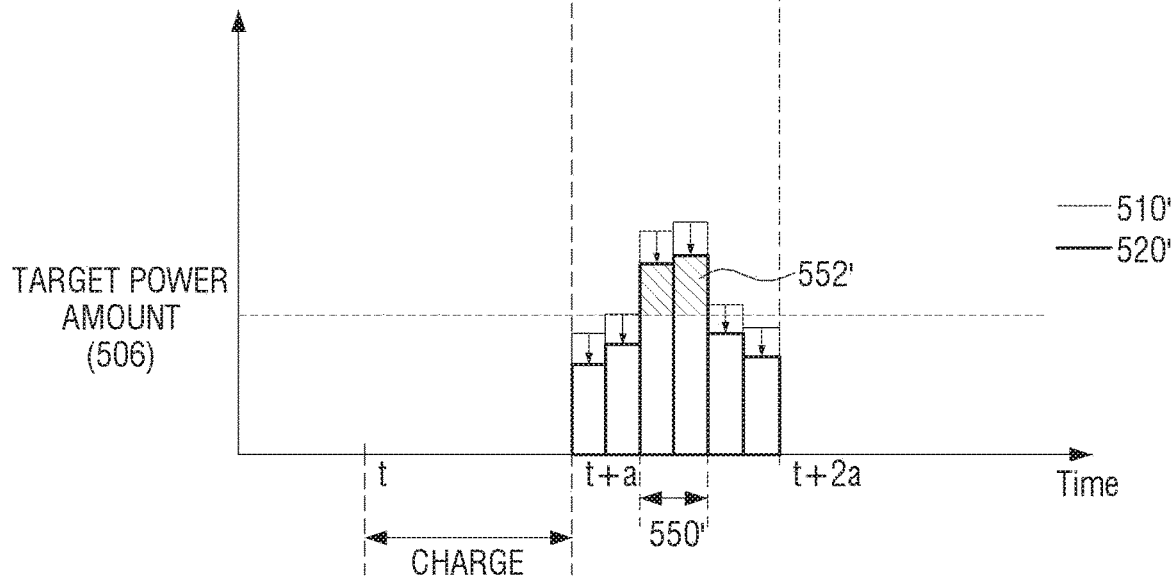

FIGS. 5A and 5B illustrate graphs provided to explain an embodiment to respond in real time so that an average of powers obtained from an external source does not exceed a target power within a predetermined time period according to various embodiments of the disclosure.

Referring to FIG. 5A, it is assumed that the energy management system 130 estimates a power consumption of the power consumption system 200 and a power production of the power generation system 140 in the first predetermined time period. In FIG. 5A, the horizontal axis indicates time, and the vertical axis indicates power (power consumption, power production, etc.).

Referring to FIG. 5A, the energy management system 130 may first estimate a remaining power amount of the battery 110 with respect to a second time point (t+a) which is a predetermined time (a) after the first time point (t).

In addition, referring to FIG. 5A, in a time period (t+a'~'t+2a) from the second time point (t+a) to the predetermined time (a) after, a time period 550 where a power 520 obtained by subtracting a power consumption 510 of the power consumption system 200 by a power production of the power generation system 140 exceeds a target power 505 may be present.

In this case, the energy management system 130 may, in the corresponding time period 550, identify a power amount 552 obtained by differentiating the power 520 obtained by subtracting the power consumption 510 by the power production, and compare the identified power amount 552 with a remaining power amount of the battery 110 estimated with respect to the first time point (t).

As a result of comparison, if the remaining power amount of the battery 110 estimated with respect to the first time point (t) is less than the identified power amount 552, the energy management system 130 may control the power conversion system 120 so that the battery 110 is charged using the power received from the outside 300 during a time period from the first time period (t) to the second time point (t+a).

Referring to FIG. 5B, it is assumed that the energy management system 130 estimates a power consumption amount per a unit time period of the power consumption system 200 and a power production amount per a unit time period of the power generation system 140 in the first predetermined time period. In FIG. 5B, the horizontal axis indicates time, and the vertical axis indicates power (power consumption, power production, etc.) per a unit time period.

The energy management system 130 may first estimate a remaining power amount of the battery 110 with respect to a second time point (t+a) which is a predetermined time (a) after the first time point (t).

In addition, referring to FIG. 5B, from among a plurality of unit time periods included in the time period (t+a'~'t+2a) from the second time point (t+a) to a predetermined time (a) after, a time period 550' including a unit time period where the power amount 520' obtained by subtracting the power consumption amount 510' of the power consumption system 200 by the power production amount of the power generation system 140 by the target power amount 506 obtained by multiplying the target power 505 by a size of a unit time period may be identified.

In this case, the energy management system 130 may, in the corresponding time period 550, respectively obtain the power amount 520' obtained by subtracting the power consumption amount 510' by the power production amount per a unit time period, identify the power amount 552' obtained by adding the power amount 520', and compare the identified power amount 552' with a remaining power amount of the battery 110 estimated with respect to the first time point (t).

As a result of comparison, if the remaining power amount of the battery 110 estimated with respect to the first time point (t) is less than the identified power amount 552, the energy management system 130 may control the power conversion system 120 so that the battery 110 is charged using the power received from the outside 300 during a time period from the first time period (t) to the second time point (t+a).

In the above-described embodiments in which the battery 110 is charged in real time so that the average power received from the outside 300 does not exceed the target power within the first predetermined time period, power is inevitably received from the outside 300 in the first predetermined time period even though the first predetermined time period is a time period where the electric charge is relatively high as compared with the second predetermined time period, and thus cost efficiency is deteriorated as compared with a case where the battery 110 is charged in advance in the second predetermined time period where the electric charge is low.

However, the battery 110 is charged in advance during the second predetermined time period as in FIG. 3 is only based on a macroscopic prediction of a situation that has not occurred yet, and thus, even if an error range is taken into consideration, it cannot be overlooked that there are variables beyond the error range.

In addition, when the average power supplied from the outside 300 exceeds the target power in any one of a plurality of time periods within the first predetermined time period, the basic fee may rise and a very large loss may be suffered. Accordingly, even when power is further supplied from the outside 300 within the first predetermined time period where the electric charge is higher than the second predetermined time period, it is necessary to control the average power supplied from the outside 300 not to exceed the target power based on a real-time estimation. Accordingly, the embodiment of FIG. 5 is worthy of use in parallel with the embodiment of FIG. 3. (Of course, the embodiment of FIG. 5 does not necessarily have to be implemented with the embodiment of FIG. 3.)

Meanwhile, in another embodiment to respond to estimated power consumption and/or an estimated power production in real time, the energy management system 130 may estimate a power consumption of the power consumption system 200 with respect to a predetermined time period, and identify a time point at which the estimated power consumption exceeds a target power. In addition, the power consumption amount of the power consumption system 200 may be controlled based on a power amount remaining in the battery 110 at a time point which is a predetermined time before the identified time point, a power consumption of the power consumption system 200 at the corresponding time point and a target power.

For example, the energy management system 130 may identify whether a current time point is a time point which is a predetermined time before the identified time point, and if yes, compare a power amount obtained by multiplying, by a predetermined time, a value obtained by subtracting a power consumption of the power consumption system 200 at the current time point by the target power with a power amount charged in the battery 110 at the current time point. In this case, the predetermined time may be preset arbitrarily.

Unless the power amount charged in the battery 110 is larger, the power consumption amount of the power consumption system 200 may be controlled and/or the power conversion system 120 may be controlled so that the battery 110 is charged using the power received from the outside 300.

In this case, the energy management system 130 may transmit, to the power consumption system 200, a control signal to reduce a power consumption of at least one of a plurality of electronic devices included in the power consumption system 200.

For example, the energy management system 130 may control an air conditioner system included in the power consumption system 200 to change a target temperature. For example, it is possible to control the target temperature to be slightly increased in the summer and to be slightly decreased in the winter. As another example, the energy management system 130 may control so that a brightness of a lighting system included in the power consumption system 200 is changed.

In this regard, in a case that the power generation system 140 is included in the energy storage system 100 as in FIG. 4, the energy management system 130 may control a power consumption amount of the power consumption system 200 in consideration of not only the power amount remaining in the battery 110 at a time point a predetermined time before the identified time point, the power consumption of the power consumption system 200 at the corresponding point and the target power but also a power production of the power generation system 140 at the corresponding time point.

For example, the energy management system 130 may identify whether a current time point is a time point which is a predetermined time before the identified time point, and if yes, compare a power amount obtained by multiplying, by a predetermined time, a value obtained by subtracting a power consumption of the power consumption system 200 at the current time point by the power production of the power generation system 140 at the current time point and the target power with a power amount charged in the battery 110 at the current time point. Upon comparison, unless the power amount charged in the battery 110 is larger, the power consumption amount of the power consumption system 200 may be controlled and/or the battery 110 may be charged using the power received from the outside 300.

The energy management system 130 may control a power consumption amount of a plurality of electronic devices included in the power consumption system 200 according to a priority of the plurality of electronic devices based on the power amount remaining in the battery 110 at the current time point, the power consumption of the power consumption system 200 at the current time point and the target power.

For example, the energy management system 130 may identify whether the current time point is a time point where the power consumption of the power consumption system 200 is larger than the target power, and if yes, compare the power amount remaining in the battery 110 at the current time point with the power amount obtained by multiplying a value obtained by subtracting a power consumption by the target power by a predetermined time. Upon comparison, unless the power amount remaining in the battery 110 is larger, the power consumption system 200 may be controlled so that a power consumption amount of a first electronic device (not illustrated) of the lowest priority from among the electronic devices included in the power consumption system 200 is reduced.

In addition, at a time point after the power consumption system 200 is controlled to reduce the power consumption amount of the first electronic device, it is possible to compare the power amount remaining in the battery 110 with the power amount obtained by multiplying a value obtained by subtracting a power consumption by the target power by a predetermined time. Upon comparison, unless the power amount remaining in the battery 110 is larger, the power consumption system 200 may be controlled so that a power consumption amount of a first electronic device (not illustrated) of the lowest priority from among the electronic devices included in the power consumption system 200 is reduced.

In this manner, with respect to the time points thereafter, the power amount obtained by multiplying a value obtained by subtracting a power consumption by the target power by a predetermined time may be compared with the power amount remaining in the battery 110. According to the result, it may be controlled so that a power consumption amount of an electronic device (not illustrated) corresponding to the next highest priority is sequentially reduced.

In this case, the priority may be predetermined. For example, in a case that the power consumption system 200 is a power consumption system within a building, it may be predetermined so that a priority of an electronic device included in a security system is higher than a priority of an electronic device included in a lighting system, and that a priority of an electronic device included in the lighting system is higher than a priority of an electronic device included in an air conditioner system.

In this regard, in a case that the power generation system 140 is included in the energy storage system 100 as in FIG. 4, the energy management system 130 may control a power consumption amount of a plurality of electronic devices of the power consumption system 200 according to a priority of the plurality of the plurality of electronic devices in consideration of not only the power amount remaining in the battery 110 at a current time point, the power consumption of the power consumption system 200 at the current time point and the target power but also a power production of the power generation system 140 at the current time point.

For example, the energy management system 130 may identify whether the current time point is a time point where the power consumption of the power consumption system 200 is larger than the target power, and if yes, compare a power amount obtained by multiplying the power consumption at the current time point by the target power and the power consumption by a predetermined time with a power amount remaining in the battery 110 at the current time point. Upon comparison, unless the power amount remaining in the battery 110 is larger, the power consumption system 200 may be controlled so that a power consumption amount of a first electronic device (not illustrated) of the lowest priority from among the electronic devices included in the power consumption system 200 is reduced.

In addition, at a time point after the power consumption system 200 is controlled to reduce the power consumption amount of the first electronic device, it is possible to compare the power amount obtained by multiplying a value obtained by subtracting a power consumption by the target power and a power production by a predetermined time with the power amount remaining in the battery 110. Upon comparison, unless the power amount remaining in the battery 110 is larger, the power consumption system 200 may be controlled so that a power consumption amount of a first electronic device (not illustrated) of the lowest priority from among the electronic devices included in the power consumption system 200 is reduced.

In this manner, with respect to the time points thereafter, the power amount obtained by multiplying a value obtained by subtracting a power consumption by the target power and a power production by a predetermined time may be compared with the power amount remaining in the battery 110 at the corresponding time point. According to the result, it may be controlled so that a power consumption amount of an electronic device (not illustrated) corresponding to the next highest priority is sequentially reduced.

Meanwhile, the energy management system 130 of the energy storage system 100 including the power generation system 140 as in FIG. 4 may supply power to the power consumption system 200 using the power produced in the power generation system 140 according to a power production amount of the power generation system 140 and a power consumption amount of the power consumption system 200 in a predetermined time period. Alternatively, the power conversion system 120 may be controlled to charge the power produced in the power generation system 140 in the battery 110 or to transmit it to the outside 300. In this case, transmitting the power to the outside 300 may correspond to selling the power produced through the power generation system 140 to the outside 300 by the energy storage system 100.

For example, if a power production amount of the power generation system 140 in a predetermined time period is larger than a power consumption amount of the power consumption system 200, the energy management system 130 may charge a power amount as much as a difference between the power production amount and the power consumption amount in the battery 110 or transmit (sell) it to the outside 300.

In this case, the energy management system 130 may, based on a charging efficiency of the battery 110, a discharging efficiency of the battery 110 and a loss rate of the power transmitted to the outside 300, control the power conversion system 120 to charge at least a part of the power produced in the power generation system 140 in the battery 110 or to transmit it to the outside 300.

In this case, the energy management system 130 may compare a value obtained by multiplying a charging efficiency of the battery 110 by a discharging efficiency of the battery 110 with a value obtained by subtracting 100 percent by a loss rate of the power transmitted to the outside 300. The energy management system 130 may, if a value obtained by multiplying the charging efficiency of the battery 110 by the discharging efficiency of the battery 110 is larger, control the power conversion system 120 to charge a power amount as much as a difference between the power production amount and the power consumption amount in the battery 110, and if not larger, control the power conversion system 120 to transmit (sell) a power amount as much as a difference between the power production amount and the power consumption amount to the outside 300.

A controlling method of an energy management system according to an embodiment of the disclosure will be described below with reference to FIGS. 6 to 10.

FIG. 6 is a flowchart of a controlling method of an energy management system, according to an embodiment of the disclosure.

Referring to FIG. 6, the controlling method may include estimating a power consumption amount of a power consumption system per a unit time period in a predetermined time period, at operation S610. The predetermined time period may be a first predetermined time period including at least a portion of the high demand period, that is, an intermediate-to-high demand period where the electric charge per a unit power is high rather than a low demand period where the electric charge per a unit power is low.

The unit time period may be obtained by dividing a time period included in the predetermined time period into multiple periods of a predetermined size. For example, in a case that the predetermined time period corresponds to a total of 14 hours, the unit time period may be set as ten minutes, 30 minutes, one hour, two hours, etc., and the predetermined time period may be uniformly divided. However, the example is not limited thereto.

In addition, a reference power amount may be obtained based on a power amount charged in the battery and an estimated power consumption amount, at operation S620. A reference power amount may be obtained so that a value obtained by adding all power amounts obtained by subtracting a power consumption amount estimated per a unit time period included in a time period in which the estimated power consumption amount exceeds the reference power amount from among the predetermined time period by the reference power amount is equal to a power amount charged in the battery. The reference power obtained by dividing the reference power amount by a size of a unit time period may be less than or equal to the target power.

A power of an amount allowing a reference power obtained by dividing a reference power amount by a size of a unit time period is less than or equal to a target power may be charged in the battery using a power received from the outside in a second predetermined time period which is different from the first predetermined time period. In the second predetermined time period, the electric charge per a unit time may be relatively low as compared with the first predetermined time. The second predetermined time may include at least a part of the low demand period.

In addition, based on an estimated power consumption amount and a reference power amount, in at least a part of a predetermined time period, power may be supplied to the power consumption system using the power received from the outside and the power charged in the battery, at operation S630.

The controlling method may include, in a time period where the estimated power consumption amount exceeds the reference power amount from among the predetermined time period, supplying power to the power consumption system using the power received from the outside and the power stored in the battery, and in a time period where the estimated power consumption amount is less than or equal to the reference power amount from among the predetermined time period, supplying power to the power consumption system using the power received from the outside.

The controlling method may include, even in a predetermined time period, based on a real-time power consumption amount and an estimated power production amount, charging the battery through power supplied from the outside or controlling the power consumption system.

In an embodiment, the controlling method may include estimating a remaining power amount of the battery at a second time point which is a predetermined time after the first time point, and then, based on a target power, an estimated remaining power amount of the battery and a power consumption amount estimated in a time period from the second time point to a predetermined time after, charging the battery using the power received from the outside during a time period from the first time point to the second time point.

For example, from among the time period from the second time point to a predetermined time after, a time period where the estimated power consumption amount is larger than a target power amount obtained by multiplying the target power by a size of a unit time period may be identified. In addition, if a value obtained by adding all power amounts obtained by subtracting a power consumption amount estimated per a unit time period included in the identified time period by the target power amount is larger than an estimated remaining power amount of the battery, the battery may be charged using power received from the outside in the time period from the first time point to the second time point.

If the energy storage system includes a power generation system, a power production amount may be estimated in a time period from the second time point to a predetermined time after. Then, in consideration of a target power, an estimated remaining power amount of the battery and a power consumption amount estimated in the time period from the second time point to the predetermined time after, the battery may be charged using power received from the outside in the time period from the first time point to the second time point.

The controlling method may include estimating a power consumption of a power consumption system, determining a time point where the estimated power consumption exceeds a target power, and based on a power amount remaining in the battery at a time point which is a predetermined time before the determined time point, a power consumption of the power consumption system at the corresponding time point and a target power, controlling a power consumption amount of the power consumption system.

For example, it may be identified whether a current time point is a time point which is a predetermined time before the identified time point. If yes, a power amount obtained by multiplying, by a predetermined time, a value obtained by subtracting a power consumption of the power consumption system at the current time point by the target power may be compared with a power amount charged in the battery 110 at the current time point. In this case, the predetermined time may be preset arbitrarily. Upon comparison, unless the power amount charged in the battery is larger, the power consumption amount of the power consumption system 200 may be controlled and/or the battery may be charged using the power received from the outside.

In this case, a control signal to reduce power consumption of at least one of a plurality of electronic devices included in the power consumption system may be transmitted to the power consumption system.

If a power generation system is included in the energy storage system, a power consumption amount of the power consumption system may be controlled in consideration of not only a power amount remaining in the battery at a time point which is a predetermined time before the identified time point, a power consumption of the power consumption system at the corresponding time point and the target power but also a power production of the power generation system at the corresponding time point.

For example, the controlling method may include identifying whether a current time point is a time point which is a predetermined time before the identified time point. If yes, a power amount obtained by multiplying, by a predetermined time, a value obtained by subtracting a power consumption of the power consumption system at the current time point by a power production of the power generation system at the current point and the target power may be compared with a power amount charged in the battery at the current time point. Upon comparison, unless the power amount charged in the battery is larger, the power consumption amount of the power consumption system may be controlled and/or the battery may be charged using the power received from the outside.

Figure 7:
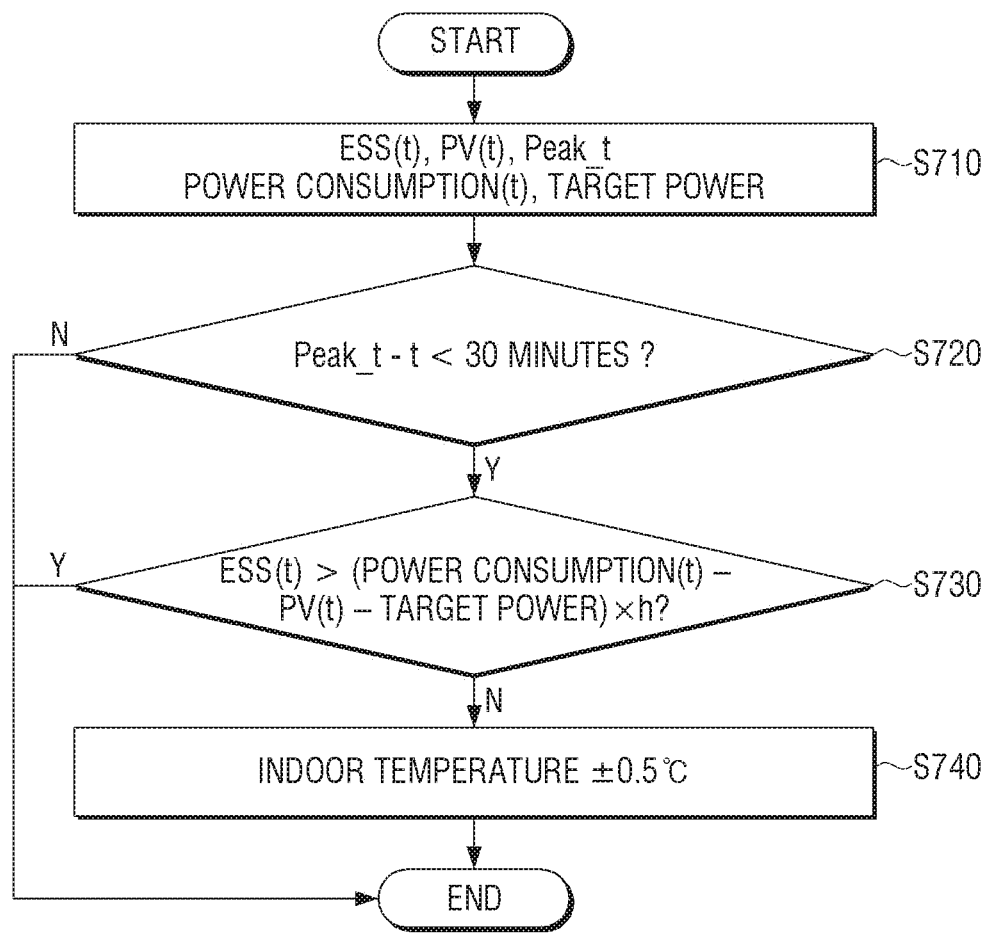
FIG. 7 is an algorithm for an embodiment to respond in advance to a time point at which an estimated power consumption exceeds a target power according to an embodiment of the disclosure.

FIG. 7 is an algorithm for an embodiment of responding in advance to a time point at which an estimated power consumption exceeds a target power according to an embodiment of the disclosure.

Referring to FIG. 7, the controlling method may include identifying, per a unit time, a power amount charged in the battery (ESS(t)), a power production of the power generation system (PV(t)) and a power consumption of the power consumption system (power consumption (t)). In addition, using a power consumption of a power consumption system estimated per a unit time, a time at which an estimated power consumption exceeds the target power (Peak_t) may be identified at operation S710.

In addition, it may be identified whether a current time point (t) is within 30 minutes before the Peak_t, at operation S720. If within 30 minutes from the Peak_t, at operation S720, at the current time point (t), it may be identified whether the ESS(t) is larger than (power consumption (t)–PV(t)–target power)*predetermined time (h), at operation S730. However, 30 minutes is only an example, and the example is not limited thereto.

Upon identification, if the ESS(t) is less than or equal to (power consumption (t)–PV(t)–target power)*predetermined time (h), a power consumption amount of an air conditioner system included in the power consumption system may be controlled. For example, in a case that the power consumption system includes an air conditioner system within a building, the power consumption system may be controlled so that a target indoor temperature in the summer is increased by 0.5° C. and a power consumption amount of the air conditioner system is reduced, at operation S740. The control of the power consumption amount of the power consumption system is not limited to the control of the target indoor temperature of the air conditioner system but can be variously implemented by controlling the brightness of the lighting system or activating the power saving mode for the entire power consumption system.

Figure 8:
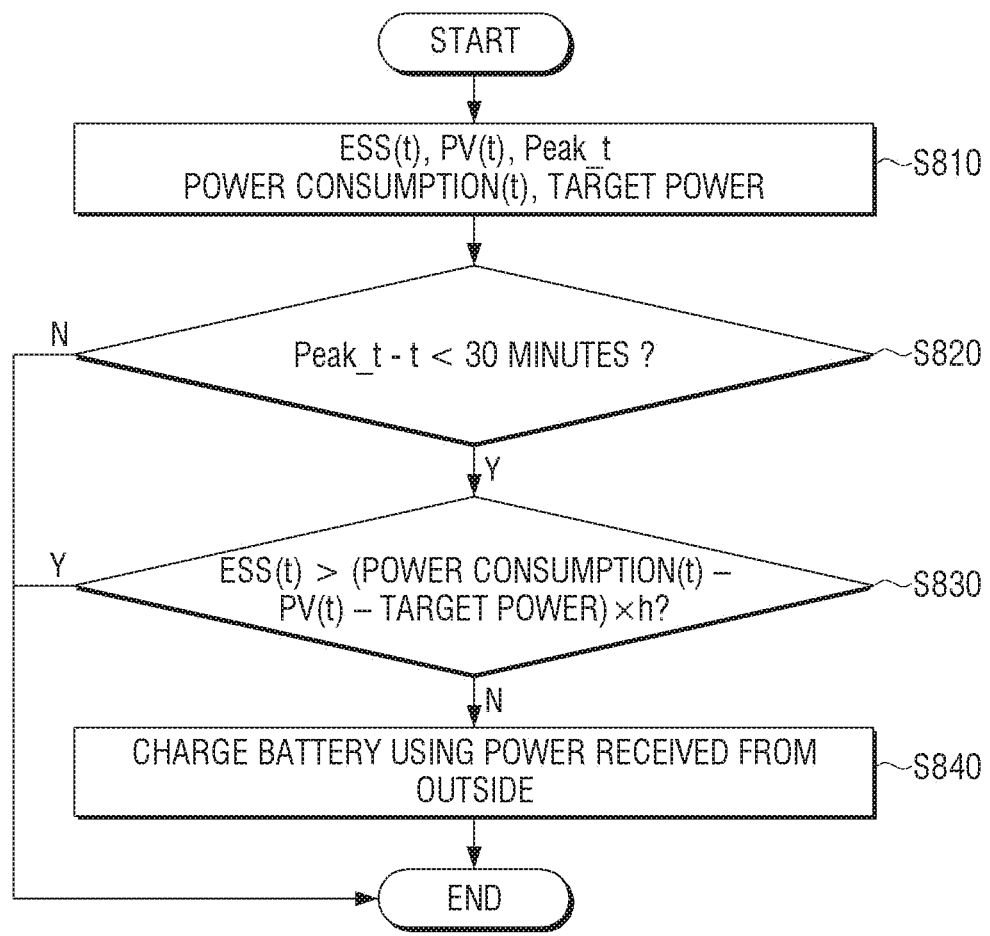
FIG. 8 illustrates an algorithm to respond in advance to a time point at which an estimated power consumption exceeds a target power according to an embodiment of the disclosure.

FIG. 8 illustrates an algorithm to respond in advance to a time point at which an estimated power consumption exceeds a target power according to an embodiment of the disclosure.

Referring to FIG. 8, the controlling method may include the same operations S810, S820 and S830 as the operations S710, S720 and S730 of FIG. 7, and then, if the ESS(t) is less than or equal to (power consumption(t)−PV(t)−target power)*predetermined time (h) at operation S830, charging the battery using power received from outside at operation S840, unlike FIG. 7.

The controlling method may include, if a response has not been made in advance to a time point at which an estimated power consumption exceeds the target power, a power consumption amount of a plurality of electronic devices included in the power consumption system may be controlled according to a priority of the plurality of electronic devices.

In this case, a power consumption amount of the plurality of electronic devices included in the power consumption system may be controlled according to a priority of the plurality of electronic devices based on the power amount remaining in the battery at the current time point, the power consumption of the power consumption system at the current time point and the target power.

For example, it may be identified whether the current time point is a time point where the power consumption of the power consumption system is larger than the target power. If yes, the power amount remaining in the battery at the current time point may be compared with the power amount obtained by multiplying a value obtained by subtracting a power consumption by the target power by a predetermined time. Upon comparison, unless the power amount remaining in the battery 110 is larger, the power consumption system may be controlled so that a power consumption amount of a first electronic device of the lowest priority from among the electronic devices included in the power consumption system is reduced. In addition, at a time point after the power consumption system is controlled to reduce the power consumption amount of the first electronic device, it is possible to compare the power amount remaining in the battery with the power amount obtained by multiplying a value obtained by subtracting a power consumption by the target power by a predetermined time. Upon comparison, unless the power amount remaining in the battery is still larger, the power consumption system may be controlled so that a power consumption amount of a second electronic device of the second lowest priority from among the electronic devices included in the power consumption system is reduced.

In this manner, with respect to the time points thereafter, the power amount obtained by multiplying a value obtained by subtracting a power consumption by the target power by a predetermined time may be compared with the power amount remaining in the battery. According to the result, it may be controlled so that a power consumption amount of an electronic device corresponding to the next highest priority is sequentially reduced. In this case, a priority may be preset arbitrarily.

If a power generation system is included in the energy storage system as in FIG. 4, a power consumption amount of a plurality of electronic devices of the power consumption system may be controlled according to a priority of the plurality of electronic devices in consideration of not only a power amount remaining in the battery at a current time point, a power consumption of the power consumption system at the current time point and the target power but also a power production of the power generation system at the current time point.

For example, it may be identified whether a current time point is a time point at which a power consumption of the power consumption system is larger than a target power. If yes, a power amount obtained by multiplying, by a predetermined time, a value obtained by subtracting a power consumption at the current time point by the target power and the power production at the current point may be compared with a power amount remaining in the battery at the current time point. Upon comparison, unless the power amount remaining in the battery is larger, the power consumption system may be controlled so that a power consumption amount of the first electronic device of the lowest priority from among the electronic devices included in the power consumption system is reduced.

In addition, at a time point after the power consumption system is controlled to reduce the power consumption amount of the first electronic device, it is possible to compare the power amount obtained by multiplying a value obtained by subtracting a power consumption by the target power and a power production by a predetermined time with the power amount remaining in the battery. Upon comparison, unless the power amount remaining in the battery is still larger, the power consumption system may be controlled so that a power consumption amount of the second electronic device of the second lowest priority from among the electronic devices included in the power consumption system is reduced.

In this manner, with respect to the time points thereafter, the power amount obtained by multiplying a value obtained by subtracting a power consumption by the target power and the power production by a predetermined time may be compared with the power amount remaining in the battery at the corresponding time point. According to the result, it may be controlled so that a power consumption amount of an electronic device corresponding to the next highest priority is sequentially reduced.

Figure 9:
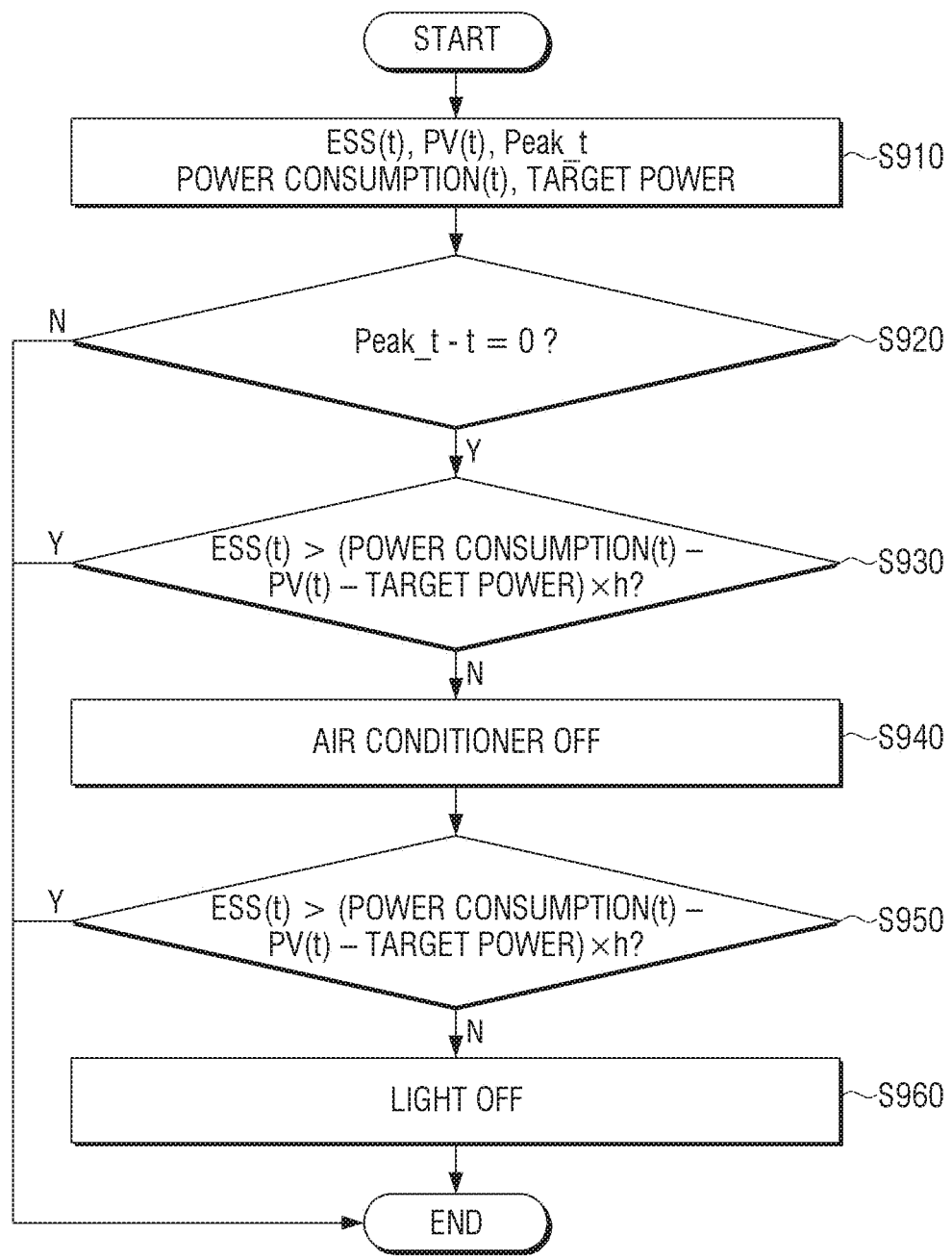
FIG. 9 is an algorithm for an embodiment to control a power consumption amount of a power consumption system according to a priority of an electronic device in the power consumption system, in a case where a response is not made in advance to a time point at which an estimated power consumption exceeds a target power according to an embodiment of the disclosure.

FIG. 9 is an algorithm for an embodiment to control a power consumption amount of a plurality of electronic devices included in a power consumption system, in a case where a response is not made in advance to a time point at which an estimated power consumption exceeds a target power according to an embodiment of the disclosure.

Referring to FIG. 9, the controlling method may include identifying a power amount charged in the battery in real time (ESS(t)), a power production of the power generation system (PV(t)) and a power consumption of the power consumption system (power consumption (t)). In addition, using a power consumption of a power consumption system estimated per a unit time, a time at which an estimated power consumption exceeds the target power (Peak_t) may be identified at operation S910.

In addition, it may be identified whether a current time point (t) corresponds to the Peak_t, at operation S920.

In this case, the operations S910 to S920 may be replaced with simply identifying whether a power consumption of the power consumption system at the current point exceeds the target power, without estimating a power consumption and Peak_t as in the operations S910 to S920 of FIG. 9.

If the current time point (t) corresponds to the Peak_t at operation S920, (or if a power consumption exceeds the target power at the current time point (t)), it may be identified whether the ESS(t) is larger than (power consumption (t)−PV(t)−target power)*predetermined time (h), at operation S930.

Upon identification, if the ESS(t) is less than or equal to (power consumption (t)−PV(t)−target power)*predetermined time (h), at operation S930, the power consumption system may be controlled so that the power of the air conditioner system of the lowest priority from among the electronic devices included in the power consumption system is turned off, at operation S940.

Thereafter (the t has been changed with the elapse of time), it may be identified again whether the ESS(t) is larger than (power consumption (t)−PV(t)−target power)*predetermined time (h), at operation S950. If the ESS(t) is still less than or equal to (power consumption (t)−PV(t)−target power)*predetermined time (h) at operation S950, this time, the power consumption system may be controlled so that the power of the lighting system of the second lowest priority is turned off, at operation S960.

Referring to FIG. 9, it is assumed that the priorities are set in advance in the order of the air conditioner system, the lighting system, and etc. However, the example is not limited thereto. In addition, although the algorithm of FIG. 9 terminates with power off for both the air conditioning system and the lighting system, the operation of sequentially turning off the power may be performed for the third and subsequent systems (or electronic devices) in accordance with the priority order. In FIG. 9, a power consumption amount is controlled by turning off powers of the air conditioner system and the lighting system. However, the example is not limited to the power off, and it is also possible to control the power consumption amount while the power is on, such as adjusting a target temperature of the air conditioner system or adjusting the brightness of the lighting system.

The controlling method may include controlling a power conversion system to, using a power produced in a power generation system, supply power to the power consumption system, charge the battery or transmit power to the outside according to a power production amount during a predetermined time period of the power generation system and a power consumption amount during the corresponding time period of the power consumption system.

For example, if a power production amount of the power generation system is larger than a power consumption amount of the power consumption system during a predetermined time period, a power amount as much as a difference between a power production amount and the power consumption amount during the corresponding period may be charged in the battery or transmitted (sold) to the outside.

In this case, based on a charging efficiency of the battery, a discharging efficiency of the battery and a loss rate of power transmitted to the outside, at least a part of the power produced in the power generation system may be charged in the battery or transmitted to the outside.

In this case, a value obtained by multiplying a charging efficiency of the battery by a discharging efficiency of the battery may be compared with a value obtained by subtracting 100 percent by a loss rate of the power transmitted to the outside. If the value obtained by multiplying the charging efficiency of the battery by the discharging efficiency of the battery is larger, a power amount as much as a difference between a power production amount and a power consumption amount may be charged in the battery. Otherwise, the power amount as much as the difference between the power production amount and the power consumption amount may be transmitted (sold) to the outside.

FIG. 10 is a diagram provided to explain an embodiment to effectively process a spare power produced in a power generation system according to an embodiment of the disclosure.

Referring to FIG. 10, it is assumed that the power generation system is a solar power generation system, and that the power consumption system is a power system within a particular building.

Referring to FIG. 10, it may be identified whether a power production amount of a solar power generation system is present during a predetermined time period, at operation S1010. If a power production amount of the solar power generation system is greater than 0 at operation S1010, it may be identified whether a building load is present, that is, whether a power system within the building consumes power, at operation S1020.

If a building load is present at operation S1020, a power charged in the battery may be blocked at operation S1030, and a solar power production power may be immediately supplied to the power system in the building at operation S1040. In this case, blocking the power charged in the battery means that the power charged in the battery is not immediately supplied to the power system, but maintains in a charged state. In addition, if the building load is larger than the solar power generation power, depending on the situation, the battery power may be used together to supply power to the power system in the building, unlike in FIG. 10.

In addition, unlike in FIG. 10, even when the building load is larger than zero at operation S1020, if a power produced in the solar power generation system is larger than the building load, a power amount as much as the remaining amount of power supplied to the power system in the building may be transmitted (sold) to the outside.

If a building load is not present at operation S1020, a power produced in the solar power generation system may be all charged in the battery or transmitted (sold) to the outside. If a value obtained by multiplying a charging efficiency and discharging efficiency of the battery is larger than a value obtained by subtracting 100 percent by a loss of power on sale (a loss rate of power transmitted to the outside) at operation S1050, power produced in the solar power generation system may be charged in the battery, at operation S1060, and otherwise, a power produced in the solar power generation system may be transmitted (sold) to the outside, at operation S1070.

However, unlike in FIG. 10, not only the charging efficiency of the battery, the discharging efficiency and the loss rate of the power transmitted to the outside but also the gain per unit power in the case of selling the power to the outside may be considered.

The controlling method of the energy storage system illustrated through FIGS. 6 to 10 may be implemented as an energy storage system 100 which is illustrated and described through FIGS. 2 to 4. In this case, the energy storage system 100 may be connected to the power consumption system 200 and outside 300 illustrated and described through FIG. 2, and exchange power.

The embodiments described above may be implemented as a single energy storage system 100, but may be implemented as a result of an external device (not illustrated) such as a user terminal or a server operating in combination with the energy storage system 100.

For example, the reference power and/or the reference power amount may be obtained, or the estimation of power consumption and/or power consumption amount of the power consumption system may be performed by the external device (not illustrated), and based on that, the energy storage system 100 receiving the reference power amount or the estimation result may perform charging/discharging of the battery 110 or reception of power with respect to the outside 300.

In addition, the control of overall elements in the energy storage system 100 which is described above to be performed by the energy management system 130 may be performed by an external device (not illustrated), and the energy storage system 100 may obtain a control signal from the external device (not illustrated), and only perform physical reception and charging/discharging of power based on the obtained control signal.

In the energy management system and controlling method thereof according to an embodiment of the disclosure, it is possible to estimate a power consumption per a unit time period of the high demand period, and thereby all power charged in the battery during the low demand period can be consumed as much as possible. Simultaneously, it is possible to prevent a situation where the average power exceeds the target power and the basic charge is increased by using the battery discharge mechanism in which the amount of power obtained from the outside does not exceed the preset reference power amount for any unit time period.

Further, the energy management system and controlling method thereof according to an embodiment of the disclosure can monitor in real time a power consumption and a power production of a power generator in the high demand period, and based on this, pre-charge the battery or control the power consumption of the power consumption system. Thereby, there is an advantageous effect that the electricity charges can be reduced.

Other aspects, advantages, and salient features of the disclosure will become apparent to those skilled in the art from the following detailed description, which, taken in conjunction with the annexed drawings, discloses various embodiments of the disclosure.

Various embodiments described above may be embodied in a recording medium that may be read by a computer or a similar apparatus to the computer by using software, hardware, or a combination thereof.

According to the hardware embodiment, embodiments that are described in the disclosure may be embodied by using at least one selected from application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions.

According to a software implementation, embodiments such as the procedures and functions described herein may be implemented with separate software modules. Each of the software modules may perform one or more of the functions and operations described herein.

Meanwhile, the computer instructions for carrying out a processing operation in the energy storage system 100 according to various embodiments of the disclosure described above may be stored in a non-transitory computer-readable medium. Computer instructions stored on such non-transitory computer-readable medium may cause a particular device to perform processing operations in an electronic device according to various embodiments described above when executed by a processor of the particular device.

The non-transitory computer readable medium refers to a medium that stores data semi-permanently rather than storing data for a very short time, such as a register, a cache, a memory or etc., and is readable by a device. In detail, the above-described various applications or programs may be stored in the non-transitory computer readable medium, for example, a compact disc (CD), a digital versatile disc (DVD), a hard disc, a Blu-ray disc, a USB, a memory card, a ROM, and the like, and may be provided.

Also, the description of the embodiments of the disclosure is intended to be illustrative, and not to limit the scope of the claims, and many alternatives, modifications, and variations will be apparent to those skilled in the art.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An energy storage system for supplying power to a power consumption system, the energy storage system comprising:
a battery;
a power conversion system; and
an energy management system configured to control the power conversion system to supply power to the power consumption system using at least one of an external power that is received from an outside or a battery power that is charged in the battery,
wherein the energy management system is further configured to:
estimate power consumption amounts of the power consumption system for each unit time period in a predetermined time period,
obtain a reference power amount based on the battery power charged in the battery and the estimated power consumption amounts, and
based on the estimated power consumption amounts and the reference power amount, control the power conversion system to supply power to the power consumption system using the external power and the battery power during the predetermined time period.

2. The energy storage system as claimed in claim 1, wherein the energy management system is further configured to:
determine a first time period where a first estimated power consumption amount exceeds the reference power amount,
control the power conversion system to supply power to the power consumption system using the external power and the battery power during the first time period,
determine a second time period where a second estimated power consumption amount is less than or equal to the reference power amount, and
control the power conversion system to supply power to the power consumption system using the external power during the second time period.

3. The energy storage system as claimed in claim 1, wherein the reference power amount is a value at which a sum of power amounts which are respectively obtained by subtracting each of the estimated power consumption amounts exceeding the reference power amount by the reference power amount, is equal to the power amount charged in the battery.

4. The energy storage system as claimed in claim 1, wherein a reference power is less than or equal to a target power and is obtained by dividing the reference power amount by a duration of the predetermined time period, and wherein a cost per a unit power when an average value of the external power in the predetermined time period exceeds the target power is higher than a cost per a unit power when an average value of the external power in the predetermined time period is less than or equal to the target power.

5. The energy storage system as claimed in claim 4, wherein the energy management system is further configured to:
control the power conversion system to charge an amount of power in the battery that allows a reference power, which is obtained by dividing the reference power amount by a duration of the unit time period, to be less than or equal to the target power using an external power in a different predetermined time period.

6. The energy storage system as claimed in claim 4, wherein the energy management system is further configured to:
estimate a remaining power amount of the battery at a second time point; and
control the power conversion system to charge the battery from a first time point to the second time point using the external power based on the target power, the remaining power amount of the battery, and the power consumption amount after the second time point to a third time point.

7. The energy storage system as claimed in claim 6, wherein the energy management system is further configured to:
based on a value, which is obtained by adding power amounts obtained by subtracting the estimated power consumption amount by a target power amount per the unit time period included in a time period where the estimated power consumption amount is larger than the target power amount obtained by multiplying the target power by a size of the unit time period from among a time period from the second time point to the third time point being larger than the estimated remaining power amount of the battery, control the power conversion system to charge the battery in a time period from the first time point to the second time point using the external power.

8. The energy storage system as claimed in claim 6, further comprising:
a power generation system,
wherein the energy management system is further configured to:
estimate a power production amount of the power generation system from the second time point to the third time point, and
control the power conversion system to charge the battery in a time period from the first time point to the second time point using the external power.

9. The energy storage system as claimed in claim 4, wherein the energy management system is further configured to:
estimate a power consumption of the power consumption system,
identify a first time point where a power consumption will exceed the target power, and
control a power consumption amount of the power consumption system based on a remaining power amount remaining in the battery at a second time point before the first time point, a power consumption of the power consumption system at the second time point, and the target power.

10. The energy storage system as claimed in claim 9, further comprising:
a power generation system,
wherein the energy management system is further configured to control a power consumption amount of the power consumption system based on a power amount remaining in the battery at a third time point before the first time point, a power consumption of the power consumption system at the second time point, a power production of the power generation system at the third time point, and the target power.

11. The energy storage system as claimed in claim 4, wherein the energy management system is further configured to:
estimate a power consumption of the power consumption system,
identify a first time point where the estimated power consumption exceeds the target power, and
control the power conversion system to charge the battery using the external power based on a power amount remaining in the battery at a second time point before the first time point, a power consumption of the power consumption system at the second time point, and the target power.

12. The energy storage system as claimed in claim 11, further comprising:
a power generation system,
wherein the energy management system is further configured to control the power conversion system to charge the battery using the external power based on a power amount remaining in the battery at a third time point before the first time point, a power consumption of the power consumption system at the third time point, a power production of the power generation system at the third time point, and the target power.

13. The energy storage system as claimed in claim 4, wherein the energy management system is further configured to control a power consumption amount of a plurality of electronic devices of the power consumption system according to a priority of the plurality of electronic devices and based on a power amount remaining in the battery at a current time point, a power consumption of the power consumption system at a current time point, and the target power.

14. The energy storage system as claimed in claim 13, further comprising:
a power generation system,
wherein the energy management system is further configured to control a power consumption amount of a plurality of electronic devices of the power consumption system according to a priority of the plurality of electronic devices based on a power amount remaining in the battery at the current time point, a power consumption of the power consumption system at the current time point, a power consumption of the power generation system at the current time point, and the target power.

15. The energy storage system as claimed in claim 1, further comprising:
a power generation system,
wherein the energy management system is further configured to, when a power production amount of the power generation system is larger than a power consumption amount of the power consumption system, control the power conversion system to charge the battery with at least some of power produced in the power generation system or to transmit the at least some of power produced in the power generation system to the outside based on a charging efficiency of the battery, a discharging efficiency of the battery, and a loss rate of power transmitted to the outside.

16. A method of an energy storage system for supplying power to a power consumption system, the method comprising:
- estimating power consumption amounts of the power consumption system for each unit time period in a predetermined time period;
- obtaining a reference power amount based on a battery power that is charged in a battery of the energy storage system and the estimated power consumption amounts; and
- based on the power consumption amounts and the reference power amount, supplying power to the power consumption system using external power from the outside and the battery power charged.

17. The method of claim 16, wherein the supplying of the power to the power consumption system comprises:
- determining a first time period in the predetermined time period where an estimated power consumption amount exceeds the reference power amount;
- supplying power to the power consumption system using the external power and the battery power during the first time period;
- determining a second time period in the predetermined time period where an estimated power consumption is less than or equal to the reference power amount; and
- supplying power to the power consumption system using the external power during the second time period.

18. The method of claim 17, wherein the supplying of the power to the power consumption system using the external power during the second time period comprises:
- supplying power of the reference power amount from the battery for each time unit period that has a power consumption amount that is greater than the reference power amount; and
- supplying power of a remaining power amount from the external power for each time unit period that has a power consumption amount that is greater than the reference power amount.

19. The method of claim 16, wherein the obtaining of the reference power amount comprises:
- identifying a plurality of time unit periods having a power consumption amount that is greater than a first reference power amount;
- subtracting the power consumption amount of each of the plurality of time unit periods from the first reference power amount to generate a differential power list;
- obtaining a sum of each value in the differential power list; and
- based on the obtained sum being zero, determining the reference power amount as the first reference power amount.

* * * * *